Dec. 5, 1939.  A. H. PNEUMAN  2,182,234
POWER OPERATED HACKSAW
Filed July 14, 1937  2 Sheets—Sheet 2

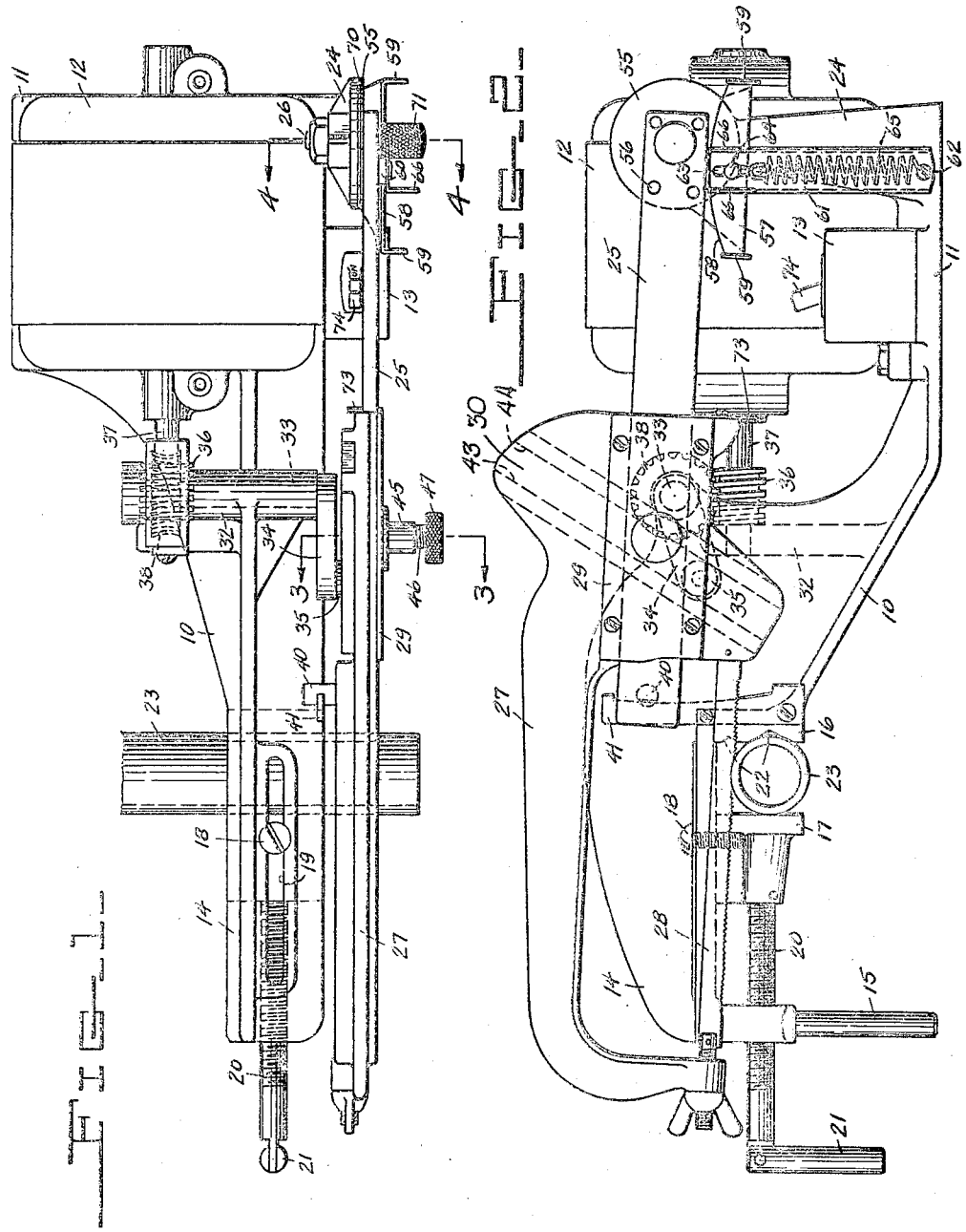

INVENTOR:
Arthur Holland Pneuman,
BY Bodell & Thompson
ATTORNEYS.

Patented Dec. 5, 1939

2,182,234

UNITED STATES PATENT OFFICE 2,182,234

POWER OPERATED HACKSAW

Arthur Holland Pneuman, Syracuse, N. Y.

Application July 14, 1937, Serial No. 153,570

5 Claims. (Cl. 29—73)

This invention relates to power operated hacksaws, and more particularly to a portable type which is bodily liftable and which may be conveniently taken to and used on the job or work after the manner of other conventional portable power operated tools.

The invention has as an object a portable power hacksaw embodying a particularly economical and efficient structure operable to effect rapid cutting of the work, and which occupies a comparatively small space and is of light weight, whereby the saw may be conveniently moved about by the operator.

The invention has as a further object, a saw of the type referred to embodying a particularly simple and conveniently manipulated mechanism for adjusting the feed of the saw into the work during the cutting stroke, and to effect movement of the saw away from the work during the return stroke, the structure being such as to render the saw free from chatter or vibration during the cutting operation, and the structure of the saw further embodies mechanism for automatically stopping the saw upon severance of the work.

The invention consists in the novel features and in the combinations and constructions hereinafter set forth and claimed.

In describing this invention, reference is had to the accompanying drawings in which like characters designate corresponding parts in all the views.

Figure 1 is a top plan view of a power operated hacksaw embodying my invention.

Figure 2 is a side elevational view of the machine shown in Figure 1.

Figure 3:
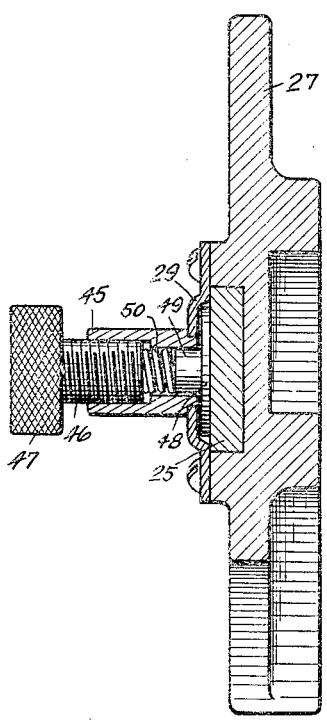
Figure 3 is an enlarged, sectional view taken on lines 3—3, Figure 1.

The structure comprises a base member 10 formed at one end with a flat portion 11 on which is mounted the driving motor 12 and a switch 13 for controlling the operation of the motor. The base 10 extends upwardly in angular relationship to the flat portion 11, and the forward end thereof is formed with a horizontally extending portion 14 supported by a leg 15, the lower end of which is arranged in alinement with the flat rear portion 11 of the base. The base is also formed with a vertical portion 16 arranged intermediate the angular extending portion and the horizontal portion 14, and which vertically extending portion 16 constitutes the stationary jaw of a vise or work holder. The movable jaw 17 of the vise is supported by a screw 18 slidably mounted in a slot 19 formed in the horizontally extending portion 14 of the base. The jaw 17 is actuated toward and from the stationary jaw 16 by means of a screw 20 provided at its outer end with an operating handle 21. The stationary jaw is preferably formed with one or more transversely extending V grooves 22 to receive circular work, such as the tube 23.

The rear portion of the base is formed, or provided, with an upwardly extending support member 24, to the upper end of which is pivoted an arm 25 on a stud 26. The arm 25 extends forwardly of the base member and a saw frame 27 is slidably mounted on the arm 25. The saw frame is of conventional U shaped form, and provided with conventional mechanism for holding a saw blade 28.

The arm 25 is of rectangular cross sectional formation, and the rear portion of the saw frame is provided with a complemental recess to slidably receive the arm 25, and the open side of the recess is closed by a detachable plate 29. The opposite side of the saw frame is provided with a slot or guide way 30 so arranged as to extend at an oblique angle to the arm 25, as illustrated by dotted outline Figure 2. The base member is provided with an upwardly extending support or bracket 32 arranged forwardly of the rear portion 11, and is formed with a transversely extending aperture in which a shaft 33 is journalled and which is provided at one end with a crank 34 having a pin 35 extending into and cooperating with the oblique slot 30 to effect reciprocation of the saw frame on the arm 25 upon rotation of the shaft 33. The shaft 33 is operatively connected to the motor 12. As here shown, the motion transmitting means, connecting the shaft 33 and motor 12, consists of a worm 36 secured to the motor shaft 37 and arranged in mesh with a worm wheel 38 secured to the opposite end of shaft 33.

During reciprocation of the saw frame 27, the arm 25 is permitted to move about its pivot 26 and effect movement of the saw blade 28 toward and from the work 23. The outer or free end of the arm 25 is provided with a pin 40 cooperable with a guide member 41 secured to the stationary jaw 16 of the work vise. The edge of the guide member 41, confronting the pin 40, is formed arcuate about the pivot 26 of the arm 25 and is provided with a stop at each end to limit the upward and downward movement of the arm 25.

Attention is called particularly to the angular arrangement of the guide slot 30, and because of the angular position of the same, the crank pin 35 is cooperable therewith to effect downward movement of the saw frame upon the rearward or cutting stroke of the saw, and upward movement of the saw frame upon the forward or return stroke thereof. That is, during the downward stroke the pin 35 is in engagement with the rear wall 43 of the guide slot 30, and during the forward stroke is in engagement with the forward wall 44, and because of the angular relationship of these walls a vertical movement is imparted to the saw frame 27 during reciprocation thereof. Means is provided for adjusting the downward and upward pressure effected by the cooperation of the crank pin and guide slot, which means is in the nature of a friction device carried by the saw frame 27.

The plate 29, see Figure 3, is provided with an internally threaded sleeve 45 to receive an adjusting screw 46 provided with a knurled head 47. A friction element or pad 48 is arranged to engage the side of arm 25, and is provided with a stem 49 slidably mounted in sleeve 45. A helical compression spring 50 is interposed between the inner end of screw 46 and stem 49 and accordingly, by threading the screw 46 inwardly the friction element 48 is pressed more firmly against the side of the arm 25. This increase of friction opposes the action of the crank and crank pin 34, 35 and accordingly, increases the downward pressure during the cutting stroke, or, in other words, increases the feed on saw blade 28. Because of the angular arrangement of the guide slot 30, a slight increase in the frictional engagement between the saw frame 27 and arm 25 is only necessary to produce an effective increase in the feed of the saw and accordingly, no appreciable amount of power is lost due to this increase in friction.

Preferably means is also provided to prevent excessive pivotal movement of the arm 25 during the return stroke of the saw frame. That is, in preventing the saw blade 28 from moving out of engagement with the work too great a distance during the return stroke of the blade which would result in the blade dropping onto the work at the commencement of the cutting stroke. This means is in the nature of a disk 55 secured to arm 25 as by rivets 56, and is formed with a channel shaped flange 57, the upper edge 58 of the outer side of which is of arcuate formation, see Figure 2, and the ends of the flange are bent outwardly to form stops 59. The outer side of the flange 57, or the arcuate edge 58 thereof, is cooperable with a hook shaped member 60 slidably mounted on the upper end of an adjustable member 61 pivotally mounted at its lower end to the base 10 on screw 62. The upper end of the member 61 is provided with a vertically extending slot 63 to slidably receive rivet 64 secured to the hook shaped member 60, and the hook shaped member 60 is yieldingly urged downwardly by a helical tension spring 65, the lower end of which is hooked about the screw 62. The upper end of member 61 is formed with outwardly extending ear portions 66 which serve as grip handles for conveniently adjusting the member about pivot 62, and likewise adjusting the hook member 60 along the arcuate edge 58 of member 55. The flange 57 extends transversely of the vertical plane passing through the pivot of arm 25 and accordingly, when member 61 is shifted forwardly, or to the left Figure 2, arm 25 is yieldingly urged downwardly and accordingly opposes upward movement of the arm 25 and saw frame 26 during the return stroke of the saw.

The purpose of this structure is to yieldingly maintain the moving parts of the mechanism in engagement, and to prevent any vibration or chattering of the saw during cutting operation. Also, this mechanism yieldingly urges the saw frame and saw towards the work 23, and tends to limit the upward movement of the saw from the work upon the return stroke of the saw frame.

Figure 4:
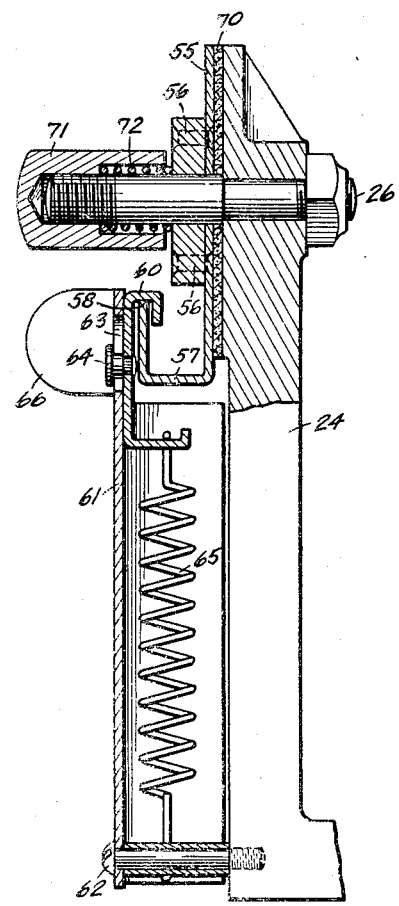
Figure 4 is an enlarged view taken on lines 4—4, Figure 1.

If desired, a friction washer 70 may be inserted between the arm 25 and the upper end of the support or, as here shown in Figure 4, between the disk 55 and the support 24. In this event, a nut 71 is threaded upon the outer end of stud 26 and is employed to compress the helical compression spring 72 to move the arm and washer 70 into engagement with the support 24.

The rear portion of the saw frame 27 is provided with a projection 73 arranged to engage the actuating element 74 of the switch 13 when the saw 28 has passed through the work and the pin 40 engaged the lower stop on guide member 41. The switch is on when the actuating element 74 is in the forward position as shown in Figures 1 and 2, and at the end of the cutting stroke immediately following the severance of the work, the element 74 is moved into off position by the projection 73.

It will be observed that because of the relative arrangement and construction, the saw is exceptionally compact and conveniently handled. Pieces may be conveniently cut from the ends of bars projecting from the stock rack by simply clamping the vise onto the bar. The leg 15 is detachable to permit the cutting end of the saw to be used in close quarters. Due to the compactness of the machine, it is particularly suited for use on the workman's bench, and affords a convenient means of quickly cutting a piece of work while the worker is free to do other operations.

What I claim is:

1. A power operated hacksaw comprising a base, an arm pivoted at one end to said base, a saw frame slidably mounted on said arm and being provided with a guide way extending at an oblique angle to said arm, a shaft journalled in the base and extending transversely of said arm and saw frame, and being provided with a crank arranged in said guide way and cooperable to effect reciprocating movement of said saw frame on said arm upon rotation of said shaft, and means for effecting rotation of said shaft.

2. A power operated hacksaw comprising a base, an arm pivoted at one end to said base, a saw frame slidably mounted on said arm and being provided with a guide way extending at an oblique angle to said arm, a shaft journalled in the base and extending transversely of said arm and being provided at its end with a crank cooperating with said guide way to effect reciprocation of said saw frame relative to said arm upon rotation of said shaft, a friction element carried by said saw frame and engaging said arm, means for adjusting said element to vary the friction between the saw frame and said arm, and a motor carried by the base and operatively connected to said shaft.

3. A power operated hacksaw comprising a base member having a forwardly extending projection, an arm pivotally mounted at one end to the rear portion of the base and extending forwardly, a saw frame slidably mounted on said arm and a saw blade carried by said frame, a work vise mounted on the forwardly projecting portion of said base and arranged in juxtaposition to said saw blade, a shaft mounted on the base intermediate its ends and extending transversely of said arm and being provided at one end with a crank, said saw frame being provided with a slot extending at an oblique angle to the axis of said arm, and said crank having a pin movable in said slot to effect reciprocation of said saw frame upon rotation of said shaft, a motor mounted upon the rear portion of the base and being operatively connected with said shaft to effect rotation thereof.

4. A power operated hacksaw comprising a base, an arm movably mounted on said base, a saw frame slidably mounted on said arm and being provided with a guideway extending at an oblique angle to said arm, a shaft journalled in the base and extending transversely of said arm and saw frame and being provided with a crank arranged in said guideway and cooperable therewith to effect reciprocating movement of said saw frame on said arm upon rotation of said shaft, means cooperable with said arm and saw frame to yieldingly resist sliding movement of said frame on said arm, and means for effecting rotation of said shaft.

5. A power operated hacksaw comprising a base, an arm movably mounted on said base, a saw frame slidably mounted on said arm and being provided with a guideway extending at an oblique angle to said arm, a shaft journalled in the base and extending transversely of said arm and saw frame and being provided with a crank arranged in said guideway and cooperable therewith to effect reciprocating movement of said saw frame on said arm upon rotation of said shaft, means carried by said saw frame and cooperable with said arm to yieldingly resist sliding movement of said frame on said arm, and means for effecting rotation of said shaft.

ARTHUR HOLLAND PNEUMAN.